Nov. 30, 1926.
C. H. AU
RECORDER
Filed Nov. 4, 1921
1,609,008
4 Sheets-Sheet 1
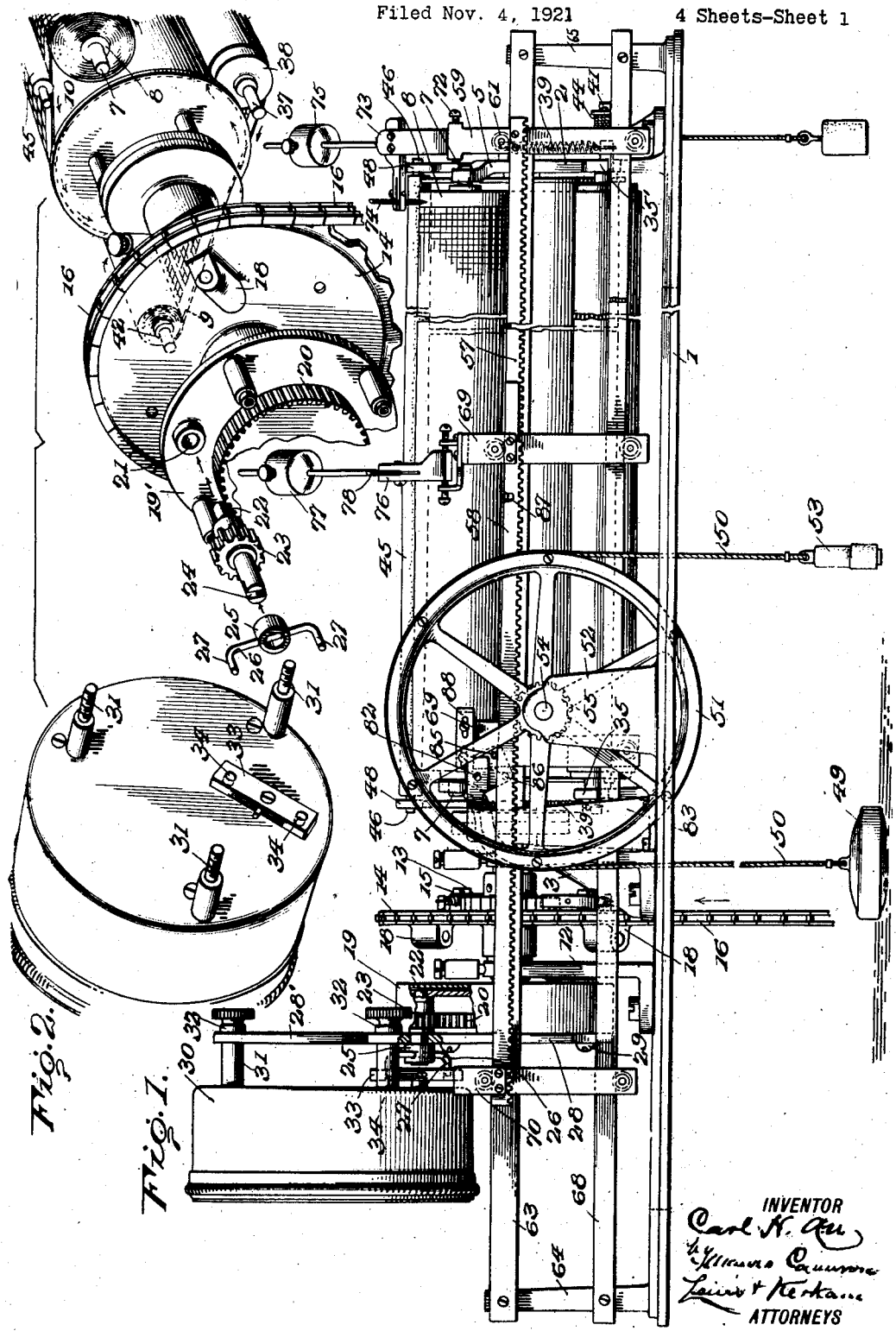
INVENTOR
Carl H. Au
ATTORNEYS Nov. 30, 1926.
1,609,008

C. H. AU

RECORDER

Filed Nov. 4, 1921  4 Sheets-Sheet 2

INVENTOR
Carl N. Au
by Mauro Cameron Lewis & Kirkham
ATTORNEYS

Nov. 30, 1926.

C. H. AU

RECORDER

Filed Nov. 4, 1921

INVENTOR
Carl H. Au
by Macro Cameron Lewis Kirkham
ATTORNEYS

Nov. 30, 1926.
C. H. AU
RECORDER
Filed Nov. 4, 1921    4 Sheets-Sheet 4
1,609,008
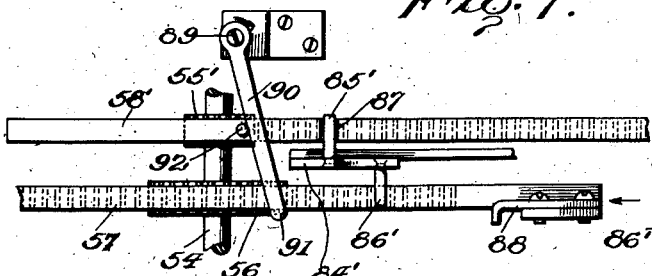
Fig. 7.
Fig. 8.
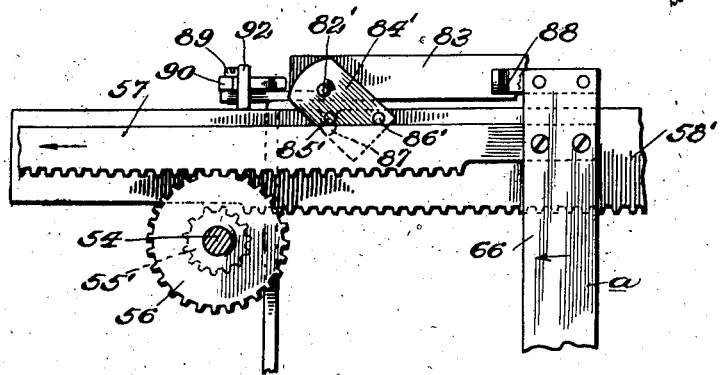
Fig. 9.
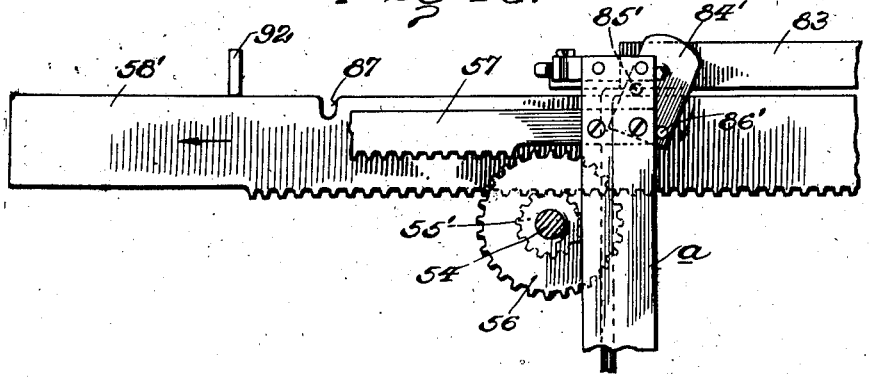
Fig. 10.
Inventor
Carl H. Au
By his Attorneys Patented Nov. 30, 1926.

1,609,008

UNITED STATES PATENT OFFICE.

CARL H. AU, OF WASHINGTON, DISTRICT OF COLUMBIA, ASSIGNOR OF ONE-HALF TO JOHN C. HOYT, OF WASHINGTON, DISTRICT OF COLUMBIA.

RECORDER.

Application filed November 4, 1921. Serial No. 512,833.

This invention relates to recorders for producing a graphic record of any variant force or movement.

One of the main objects of the invention is to produce a reliable recorder that shall automatically record any variant force or movement in connection with a timing device, to the end that the times and rates of variation shall appear on the record, which recorder shall be so constructed as to require the minimum of skilled labor in its care and shall employ a record-sheet of convenient size for filing and inspection, and on which the record shall appear in a form that can be quickly and accurately read.

Such recorders are frequently used under conditions where they are required to operate for weeks, and even months at a time, without inspection and it is therefore of the highest importance that they should not only function accurately when they do function, but that they should continue to function uninterruptedly under trying conditions. Moreover, they are frequently located at points where skilled labor is only obtainable with difficulty and after much delay, and it is therefore of the utmost importance that they should be so constructed that highly skilled labor is not necessary when parts, such as the timing mechanism for example, are to be removed or other parts are to be repaired or adjusted. Particularly with relation to the timing mechanism, experience has heretofore taught that the connections between the timing mechanism and other parts of the device are subject to strain and wear which are liable to seriously interfere with the correct operation of the timing mechanism and ultimately to throw it out of commission altogether, with the result that the entire recorder ceases to function and the desired record over a considerable period of time is irretrievably lost. It is one of the objects of the present invention to overcome these serious objections and simplify the construction and operation of such recorder. Still further objects will appear in connection with the following description.

One of the uses to which such recorders have been put is that of recording the rise and fall of the water level in rivers, lakes, conduits and the like and, for the purpose of illustrating the invention, such a recorder will be shown and described herein, but it is to expressly understood that the invention may be applied to other uses.

One of the forms which the invention may assume is shown in the accompanying drawings, such drawings being for the purpose of illustration only and not being designed to define the limits of the invention, reference being had to the appended claims for that purpose.

In said drawings:—

Fig. 1 is a side elevation of a recorder embodying the invention when employed to record the water stage or the rise and fall of water in lakes, reservoirs, rivers and the like;

Fig. 2 is a perspective detail showing certain of the elements separated or parted for the purpose of clear illustration;

Fig. 7 is a broken plan view and Fig. 8 is a detail elevation, partly in section, of another form which the invention may assume;

Fig. 9 is a side elevation of Fig. 7 looking from the bottom of said figure; and Fig. 10 is similar to Fig. 9 with the parts shown in a different position.

Figure 3:
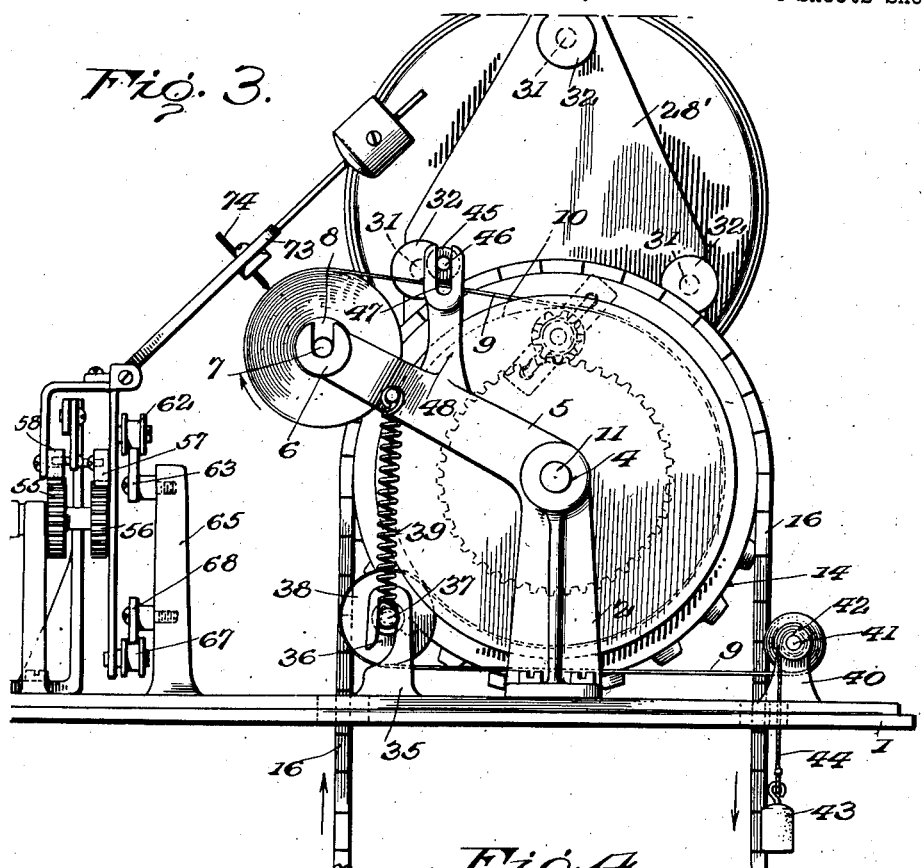
Fig. 3 is an end elevation of Fig. 1 looking from the right.

Referring to the several figures of the drawings in which like reference numerals indicate like parts, 1 is a base, preferably of metal, on which the operative parts of the mechanism are supported. 2 and 3 are vertical standards secured to the bed-plate 1 in any suitable manner. The two standards are substantial duplicates of each other and their construction will be best understood by reference to Fig. 3. They are each provided with a bearing 4 and an arm 5 projecting laterally upward, said arms having at their reenforced ends slotted bearings 6 for receiving the ends of the shaft 7 carrying a roller 8, on which the record-sheet 9 is wound and from which it is unwound and fed to the device by the mechanism hereinafter described.

For the purpose of advancing the sheet through the device, a drive roll 10 is mounted on a shaft 11, taking bearing in the bearings 4 of the standards 2 and 3. The shaft 11 projects through the bearing 4 of standard 2 and through standard 3, as well as through a bearing in the standard 12 (Fig. 1), and has a ratchet 13 keyed thereto. Mounted to turn loosely on the shaft 11 at the side of the ratchet is a sprocket wheel 14 carrying a spring-pressed pawl 15 engaging the ratchet 13. A sprocket chain 16 passes over the sprocket wheel 14 and supports a weight 17 (Fig. 3). The pawl and ratchet engagement between the sprocket wheel and the shaft causes the weight to turn the shaft and the roll 10 in the direction of the hands of a clock as viewed in Fig. 3, and when it is desired to elevate the weight, this can be done without any movement being imparted to the roll 10, by reason of the pawl and ratchet construction. This elevation or winding up of the weight may be accomplished by a pull on the chain 16, but, for convenience, there is provided on the side of the ratchet wheel 14 two lugs 18, 18 (see Fig. 1) having holes or openings therein for engagement of a winding lever or bar.

The shaft 11, bearing the roll 10 and the sprocket wheel 14, not only projects into but projects through the bearing in the standard 12 (Fig. 1) and into a casing 19. On the end of the shaft within the casing, a large gear 20 is keyed to the shaft and, in the wall 19' of the casing 19, immediately above the gear 20, is formed a bearing 21 which receives the end 22 of a shaft carrying a small pinion 23 engaging the gear 20; the other end of the pinion shaft projects outward through the casing 19 and is provided with a slot 24 (see Fig. 2). A sleeve 25 fits loosely over the slotted end of the shaft and is provided with a yoke 26 extending through the sleeve, and bent so as to provide right-angular arms 27, 27. When the sleeve 25 is slipped over the slotted end 24 of the shaft, that portion of the yoke within the sleeve enters the slot within which it can turn and slide, and the yoke and sleeve thus revolve with the shaft.

The left-hand wall of the casing 19, as shown in Fig. 1, is in the form of a plate 28, secured to the casing in any suitable way as by screws 29, and is provided with an upwardly projecting part 28' for supporting timing mechanism 30, which is in the form of a clock with the motor springs removed, so that it forms in effect an escapement mechanism. The back of this clock is provided with three shouldered-screws 31 which project through holes in the plates 28, 28' and are engaged by knurled nuts 32 to securely bolt the clock to the plates 28, 28'. This clock mechanism is enclosed in a moisture and dust-proof case, and the main shaft thereof projects through the rear of the case and has a bar 33 (Fig. 2) secured thereto, which bar is provided with two openings 34, 34 adjacent to its opposite ends. The arms 27, 27 on the yoke 26 fit loosely into the openings 34, 34, so as to have slight play therein, thus in effect forming a universal joint.

It will thus be seen that the weight 17 not only serves to drive the roll 10 but also, through the described connections, becomes the motor for the clock mechanism 30, the movements of the weight and of the roll being thus timed by the escapement of the clock mechanism. By reason of the connection secured by the sleeve 25 and yoke 26 and the bar 33, any wear or strain on the parts, or any faulty construction, which would tend to throw the shaft of the clock out of alinement with the shaft 11 is compensated for. Without such compensation, such loss of alinement has heretofore resulted in interference with the operation of the clock mechanism and the interruption of the functioning of the entire device. Furthermore, by reason of this connection I am enabled to use a much lighter weight 17 than heretofore employed. This decrease in weight (from 40 pounds to 8 pounds) results in a decreased strain and wear on the parts and thus contributes materially to the durability of the device. Moreover, should the clock mechanism for any reason get out of order, any unskilled workman can readily remove the clock mechanism by loosening the knurled nuts 32 and either replace a new clock mechanism or the old clock mechanism when repaired; this eliminates delay and the necessity for the attention of a highly skilled attendant.

Projecting up from the base-plate 1 and immediately under the arms 5 of the standards 2 and 3 (see Fig. 3) are two standards 35. Only one of said standards is shown in said figure, but it will be understood that there is one at each end opposite the respective standards 2 and 3 (see Fig. 1). These standards 35 are provided with downwardly opening slots 36 for receiving the projecting ends 37 of a shaft bearing tension roll 38, the shaft being held in the slots 36 by springs 39, one end of which engages the shaft and the other of which engages a pin on the frame, as for example, on the arm 5, as shown in Fig. 3. On the opposite side of the standards 2 and 3 from the standards 35 are provided two standards 40 (see Fig. 3). Only one of these standards is shown in Fig. 3, but it will be readily understood that there is a similar standard at the other end opposite the standard 3. These standards 40 are slotted, as shown, and receive the ends of a shaft 41 carrying a roll 42.

The record-sheet 9 is drawn from the feed or stock roll 8 on the shaft 7 around and under the driving roll 10 which it engages by friction, then around and under the tenson roll 38, and then under and around the receiving roll 42, on which it is wound.

It is important that the record-sheet should firmly and smoothly engage the driving roll 10, and the spring-pressed roll 38 serves to hold the record-sheet in frictional engagement with the roll 10 and tends to smooth out wrinkles that might be formed.

When the device is in operation, the driving roll 10 serves to draw the record-sheet from the feed roll 8, whence it passes around the driving roll, the tension roll 38 and the receiving roll 42, on which latter it is wound by the action of a weight 43 (see Fig. 3) attached to the cord 44 wound around the end of the shaft 41 as shown in Fig. 1.

In order to insure that the record-sheet 9 is evenly engaged with the driving roll 10 as it leaves the feed-roll and to remove any slight inclination of the paper of the sheet to bulge up at one side or the other, the roll 45 (see Fig. 3) bears on the record-sheet 9 by gravity, with its shaft ends 46 engaging in slots 47 formed in the upper ends of standards 48 projecting upward from the arms 5 on the standards 2. Only one of the standards 48 is shown in Fig. 3, but it will be readily understood that there is a like standard at the opposite end of the roll 45, see Fig. 1.

Figure 5:
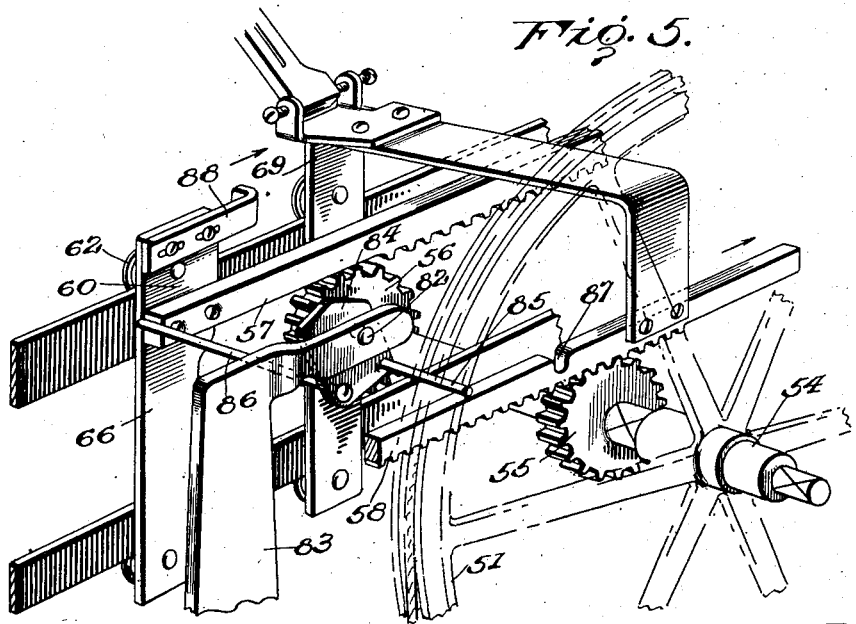
Figure 6:
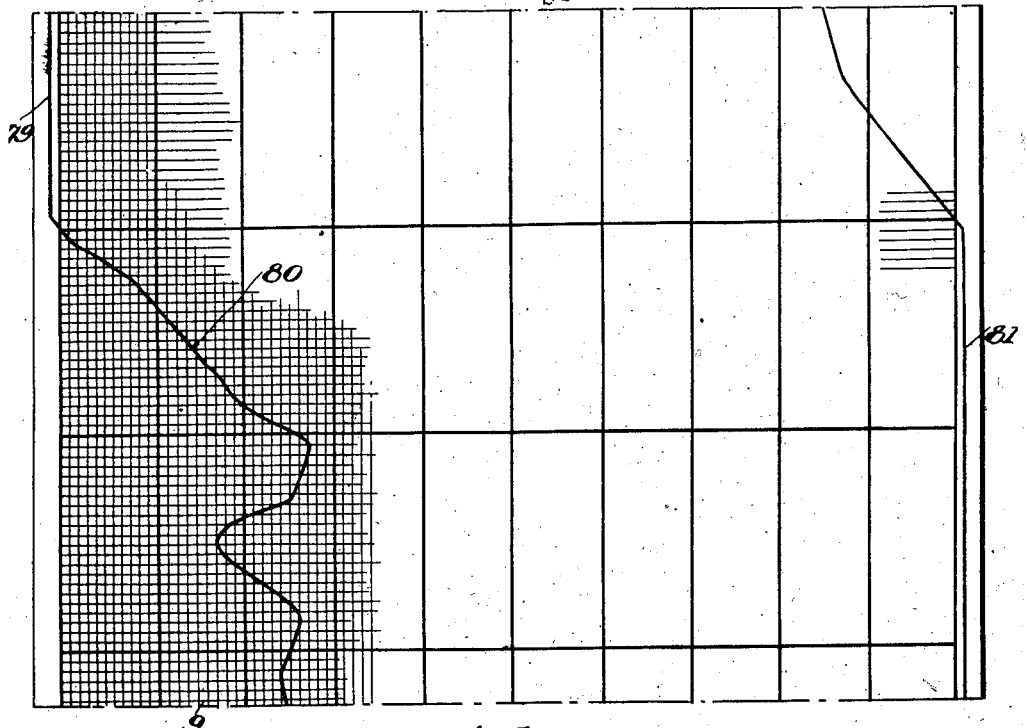
Fig. 6 is a plan view of a portion of the record.

By reference to Fig. 6, it will be seen that the record-sheet 9 is provided with uniformly spaced transverse lines thereon corresponding to units of time, and longitudinally disposed uniformly spaced lines corresponding to units of variations which, in the present case, would be units in the variation of the height of the water level. Suitable means are provided for controlling the movement of a stylus to trace a record line upon the record-sheet to record these variations. Said means will now be described. A float 49 (Fig. 1) is secured to a suitable cable 50 passing over a pulley wheel 51 mounted to turn in suitable bearings on standards 52 projecting up from the base-plate 1. Only one of the standards 52 is shown. On the opposite end of the cable from the float 49 is a counterpoise weight 53. On the shaft 54 of the pulley 51 are secured two pinions 55 and 56, here shown equal in size, Fig. 3, to mesh with two parallel rack bars 57 and 58, respectively. Rack bar 57 is supported by two carriages 59 and 60 having grooved rollers 61 and 62 traveling on a rail 63 supported on standards 64 and 65 (Fig. 1.) These two carriages are each provided with a depending arm 66 (see carriage 60 in Figs. 4 and 5) which carries on its lower end a grooved roller 67 engaging the under side of a rail 68, also supported on the standards 64 and 65. By this construction the carriages move freely, but with absolute precision, and without either lateral or vertical play. In like manner, rack bar 58 is mounted on two carriages 69 and 70 (Fig 1.) mounted to travel on the rail 63 and guided by the rail 68, the carriages for the rack bar 57 being to the right of those supporting the bar 58.

Mounted on the carriage 59 (see Fig. 1) between two steel cone-shaped pivots, one of which is shown at 72, is a stylus-bearing lever 73 having a stylus 74 (here shown as a pencil point) clamped in an arm offset to the left therefrom, said lever 73 being provided with an adjustable weight 75. In like manner carriage 69 is provided with a similar pivoted lever 76 having a weight 77 and a stylus 78 clamped in said lever.

The two rack bars 57 and 58 are so mounted and proportioned that the rack bar 57 is engaged and operated by the pinion 56 in all stages of water level below a predetermined stage which, as here shown, is taken at ten feet above the zero level. As the water rises, the rack bar 57 advances from left to right in Fig. 1, and the stylus 74 traces the record line on the record-sheet until the predetermined high level, here assumed as ten feet, is reached. During this time, rack bar 58 has been out of engagement with the pinion 55 but the stylus 78 has been resting on the margin of the record-sheet slightly to the left of the marginal line of the record proper, and preferably at a distance from said marginal line exactly equal to the space between the longitudinal lines on the record-sheet. As before stated, the distance between these longitudinal lines corresponds to a unit of variation in the water level. The stylus 74 has therefore been tracing a record corresponding to the variations in water level upon the face of the record-sheet, and stylus 78 has been tracing a straight line 79 known as a "datum" line on the left-hand margin of the sheet (see Fig. 6). Just before stylus 74 passes off of the right-hand marginal line of the record-sheet, rack bar 58 is thrown into operative relation with the pinion 55 and the two styli trace exactly parallel lines near the opposite margins of the sheet, each of which corresponds to the continued rise of the water level. At the instant when the stylus 74 has passed beyond the marginal line of the record a distance exactly equal to the space between the longitudinal lines on the record-sheet, rack bar 57 is thrown out of engagement with pinion 56 and thereafter stylus 78 traces a line 80, Fig. 6, on the record-sheet, corresponding to the variations in water level above ten feet, and stylus 74 traces a straight datum line 81 on the blank margin of the record-sheet and at a distance from said margin equal to the distance between the longitudinal lines of the record-sheet. On the other hand, should the water level fall below the assumed high mark of ten feet, the stylus 78 passes off of the left marginal line of the record and traces a straight datum line on the left-hand margin, and stylus 74 is again brought into operation, moving from the right toward the left-hand side of said sheet. The datum line serves as an index whereby, when the record is read, the reader can always immediately determine which stylus is operating by glancing at the datum line on the side of the sheet.

The means whereby the rack bars 57 and 58 are thrown into and thrown out of operative relation with the pinions 55 and 56 will now be described.

Figure 4:
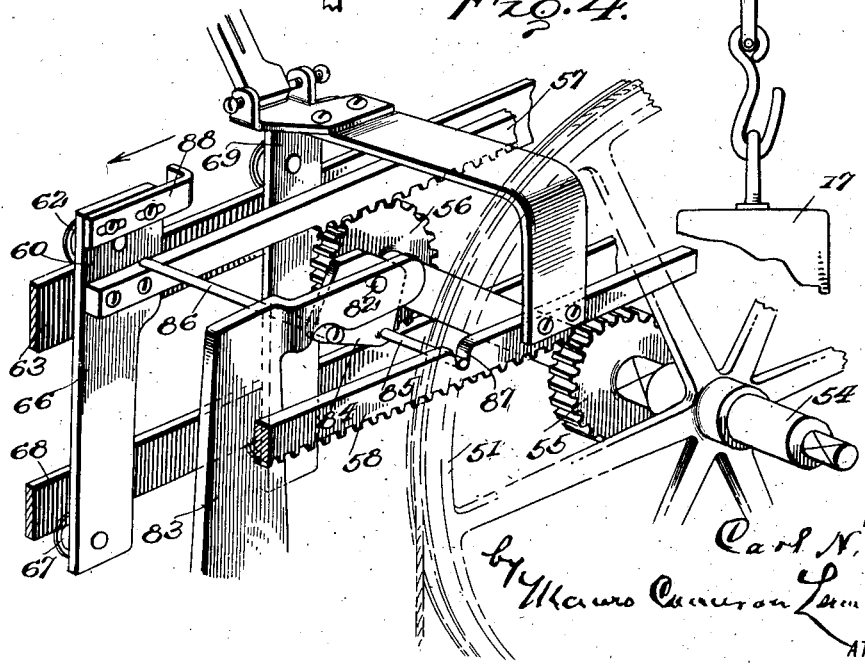
Figs. 4 and 5 are perspective details, the structure being shown somewhat expanded laterally for the purpose of clearness of illustration.

Referring to Figs. 4 and 5, Fig. 4 shows the rack bar 57 just after it has been thrown into operative relation with the pinion 56, and the rack bar 58 just after it has been thrown out of operative relation with the pinion 55; and Fig. 5 shows, on movement in the reverse direction (that is, left to right), the rack bar 57 just after it has been thrown out of operative relation with the pinion 56 and the rack bar 58 just after it has been thrown into operative relation with the pinion 55, together with the means employed for locking the respective bars in a stationary position, to the end that they may be picked up with accuracy and again thrown into operation.

Pivoted at 82 to a projecting arm or standard 83 is a plate 84 provided with two pins 85 and 86 projecting from the opposite sides thereof. The rack bar 58 is provided on its upper side with a notch 87 having upper rounded corners, said notch being in position to be engaged by the pin 85 when the rack bar 58 is out of engagement with pinion 55, at which time the end of the pin 86 rests on the top of the rack bar 57 as shown in Fig. 4. Carriage 60 has a horizontal arm 88 adjustable thereon and projecting forwardly therefrom in the direction of the carriage 69.

Just before the carriage 69 reaches the position shown in Fig. 4, in moving from right to left, said carriage strikes the arm 88. Referring to Fig. 4, and assuming the parts to be moving in the opposite direction from that shown by the arrow—that is, assuming them to be moving from left to right, the arm 88 on carriage 60 strikes the carriage 69 and moves it from left to right just before the rack bar 57 passes off of the pinion 56, and thus imparts movement to the carriage 69 and with it the rack bar 58, a sufficient movement from left to right to throw said rack bar into engagement with pinion 55. This movement of the rack bar 58 turns the plate 84 on its pivot 82 by reason of the engagement of pin 85 in slot 87, causing said pin to rise out of the slot and the pin 86 to be depressed behind the end of the rack bar 57 just as the latter becomes disengaged from the pinion 56 (see Fig. 5). The pin 86 thereby acts as an effective stop to prevent any backward movement of the rack bar 57 and, as its forward movement is prevented by a suitable stop (not shown) at the other end, the rack bar remains just out of engagement with the pinion 56 while the rack bar 58 is engaged by the pinion 55, and the pin 85 rests upon the upper surface of said bar.

On the reverse movement, that is with the carriage 69 moving from right to left (see Fig. 5), the carriage 69 strikes the projecting arm 88 just as the pin 85 comes above the slot 87 on rack bar 58. The pin 85 is forced into said slot by the turning of the plate 84 imparted to it by the rear end of the rack bar 57 against pin 86. The movement of the carriage 69 thus imparts a slight movement to the carriage 60 just before pin 85 enters the slot 87 and just before the rack bar 58 passes off of the pinion 55. This movement imparted to the rack bar 57 serves to bring said rack bar into engagement with the pinion 56, after which the rack bar 57 moves from right to left and the rack bar 58 remains at rest, out of engagement with pinion 55 and locked in position by the pin 85 in engagement with the slot 87. This position of the parts is shown in Fig. 4.

By the provision of the two rack bars and the means for throwing the one into operation as the other passes out of operation, and the two styles operated by said bars, I am enabled to obtain an accurate record not only of variations in water level below a predetermined high level, but also a record of any variations in water level above said predetermined level, and this without in any way increasing the width of the record-sheet or diminishing the size of the unit of spacing on said sheet, and at the same time enable the reader, by referring to the datum lines on the margins of the sheet, to tell instantly whether the reading at any particular part of the record relates to variations above or below said predetermined high level. This is a matter of much importance in economy in record-sheets, since it is not necessary to provide a sheet wide enough to record any abnormal rise in the water level, thus effecting not only economy in the amount of paper employed in the record sheet itself but, what is of much more importance, economy in the space required for the storing of the records after they are taken from the instrument. Furthermore, this is accomplished without extending the length of the machine, as would be necessary if a wide record-sheet were employed.

By referring to Figs. 1 and 3 of the drawings, it will be seen that the record is traced by the styles on the record-sheet while the same is still on the feed or stock roll, instead of at the point where the record-sheet passes over the driving roll 10. The record-sheet is wound with great smoothness and evenness upon the stock roll and, by thus making the record upon the sheet before it leaves the stock roll, I am enabled to avoid any inaccuracies in the record that might arise from any variations in the position of the record-sheet as it is received by the driving roll, or any stretching of the sheet. Moreover, I avoid any engagement of the stylus point with wrinkles in the sheet which frequently occur when the latter is passing over the driving roll. When the record is made on the driving roll as heretofore, the wrinkles have resulted in tearing or scoring a line in the sheet and interrupting the functioning of the apparatus. Such wrinkles do not occur in the sheet as wound on the stock roll.

But while, for the reasons indicated, I prefer to trace the record on the record-sheet before it leaves the stock roll, I desire it to be expressly understood that the record line may be traced upon the record-sheet at any other point in its travel from the stock roll to the receiving roll without departing from the spirit of my invention as embodied in other of the specific details herein described.

As thus far described, the record line for any rise in the water level above a predetermined high level which, for the purpose of this description, we have assumed as ten feet, is made to the same scale or in the same proportion as the record line for any rise of the water level below said predetermined high level line. The periods of abnormal variation, however, are infrequent and, for the practical purposes for which such records are employed, are of less importance, since a small variation at low water is of much greater importance in practical affairs than a much large variation is at high water stage. While it is desirable to record these high stages, it is also desirable to secure the record thereof without increasing the width of the record for normal conditions. I am able to accomplish this by providing means whereby the stylus recording the abnormal variations traces the record on a reduced scale on the same record sheet employed for normal variations.

Figs. 7, 8, 9 and 10 illustrate an expression of the inventive idea, wherein variations below the predetermined high point are recorded on a scale the same as that heretofore described, while variations above the predetermined point are recorded on a reduced scale. As here shown, the proportions are as 2:1, but any desired proportion may be adopted, as will be readily understood from the following description.

Referring to Fig. 8, the pulley 51, shaft 54, the pinion 56, and the rack bar 57 are as previously described. Pinion 55' on the shaft 54 is one-half the diameter of pinion 56, and the rack bar 58' is made wide enough so as to be operated by the smaller pinion 55' while still leaving the top of the rack bar in position to cooperate with the other parts as hereinafter described. It will be readily understood that, for any given variation in the water level, the rack bar 58' will be moved over one-half the distance that the bar rack 57 is moved for a like variation, and hence the record of the variations effected through the movements of the rack bar 58' will be on a scale fifty percent reduced from that effected through the movements of the rack bar 57.

Owing to the difference in the rate of movement between the two rack bars 57 and 58', the means employed for throwing one of the rack bars into operation as the other passes out of operation that have been previously described will not be effective and, for the purpose of effecting this shifting from one rack bar to the other, I employ the following mechanism:—Pivoted on a suitable part of the frame at 89 (Fig. 7) is a lever 90 extending across and above the two rack bars 57 and 58', with the outer end 91 of said lever in the path of the arm 88 on the carriage 60 supporting the rack bar 57. A pin 92 projects upward from the rack bar 58' in a position to engage and be engaged by said lever 90, the distance between the pivot 89 and the pin 92 being one-half the distance between the pivot 89 and the end 91 of the lever where it is engaged by the arm 88. When the rack bar 57 is moving in the direction indicated by the arrow in Fig. 7, and engages the end 91 of the lever 90, the rack bar 58' will be moved by reason of the engagement of the lever 90 with the pin 92 on said rack bar, but will be moved only half as fast as the rack bar 57 is moving. This shifting of the rack bar 58' just before the rack bar 57 passes off of the pinion 56 will shift the rack bar 58' into operative engagement with the pinion 55', and thereafter said rack bar 58' and the stylus controlled and carried thereby will trace the record line on the record-sheet, but on a scale of fifty percent reduced from that which was traced by the stylus controlled by the rack bar 57. On the reverse movement, that is, when the rack bar 58' is moving in the reverse direction from the arrow shown in Fig. 7, the pin 92 will engage the lever 90 and, through said lever, transmit motion to the arm 88, with which it is in contact, and thereby impart a movement to the rack bar 57 at a speed twice that at which the rack bar 58' is moving, thereby effecting the shifting of the rack bar 57 into engagement with the pinion 56, and shifting the rack bar 58' out of engagement with the pinion 55', as will be understood from the previous description.

The difference in the rates of movement of the two rack bars 57 and 58' also necessitates a proportionate variation in the construction of the locking plate or latch. This latch is shown in Figs. 7, 8, 9 and 10 as plate 84' pivoted to a supporting part of the frame 83. The latch plate 84' is symmetrically pivoted at 82' and is provided with two pins 85', 86' projecting from opposite sides thereof at such points that, when the pin 85' is resting in the slot 87 (Fig. 9) to lock the rack bar 58' against movement, the pin 86' is resting upon the top of the rack bar 57, and vice versa, when the rack bar 58' is moving (see Fig. 10) the pin 86' is depressed behind the rear end of the rack bar 57 to lock it against rearward movement and the pin 85' is resting upon the top of the rack bar 58' (see Fig. 10). Referring now to Fig. 7, wherein the pin 85' is shown in the slot 87, locking the rack bar 58', when the arm 88 impinges upon the end of the lever 91, and thus imparts a movement from right to left to the rack 58', movement will be imparted to the pin 85' (engaged in the slot 87) from left to right, turning the latch plate 84' on its pivot. This occurs just at the time when the rear end of the rack bar 57 has barely passed beyond or to the left of the pin 86', and such pin is, by the turning movement of the plate, depressed to the rear of the rack bar 57, as shown in Fig. 10, and the pin 85' rides upon the upper edge of the rack bar 58'.

It will be understood, of course, that, with the parts in the position shown in Fig. 10, the rack bar 57 is provided with a stop (not shown) which prevents its movement from right to left, and said rack bar is therefore effectively held just out of engagement with the pinion 56 where a very slight movement from left to right will serve to throw it into engagement therewith and the parts proceed to operate as heretofore described.

While the primary object of the latch plate 84 or 84' and the pins carried thereby is to lock the respective rack bars when disengaged from their operating pinions, I preferably so position the locking pins on the latch plate that they shall not only perform this locking function, but shall also impart a slight additional movement to the rack that is being locked, for the purpose of insuring that the last tooth on the rack bar that is being locked shall effectively clear the teeth on the operating pinion. With this end in view, the locking pin that enters the slot 87 is so positioned on the latch plate that just at the instant when the other pin has descended to the rear of and in contact with the rack bar 57, the pin 85 or 85', as the case may be, has not quite cleared the slot 87, and the further movement of the rack bar 57 causes the pin to ride up the rounded corners of the slot 87 and thus impart a slight thrust to the pin 86—86', whereby the last tooth on the rack bar 57 is thrust just beyond the reach of the teeth of its operating pinion 56 and a slight clearance between these teeth is effected. This insures against any accidental shifting of the rack bar 57 into engagement with its pinion, as well as against a rattle of the parts even if such shifting did not occur. It will be readily understood that, on the reverse movement when the pin 85—85' enters the slot 87, a like slight thrust or impulse is imparted to the rack bar 58' for a like purpose.

In the operation, let us suppose that the recorder is positioned above a body of water to record the rise and fall thereof. The gradual descent of weight 17, insured by the escapement mechanism, will, through the medium of drum 10, cause sheet 9 to be fed continuously at a uniform rate of speed, off the stock roll 8 and onto the receiving roll 41. Assuming that a low stage record is being made, that is, one where the maximum rise of water will not exceed for example ten feet, float 49 and weight 53 will, by their raising and lowering movements due to changes in water level, cause rack bar 57 to move stylus 74 back and forth and trace a record on sheet 9. During the making of this record stylus 78 will trace a straight or "datum" line at the left hand margin of the sheet. If, by reason of a freshet or flood, the water should rise beyond the predetermined height before mentioned, float 49 continuing to rise will cause rack bar 58 to move stylus 78 back and forth and trace a record on sheet 9. This last record will indicate changes in water level during the period in which the water levels exceed the predetermined height above referred to, and in the making of this record stylus 74 will trace a straight or "datum" line on sheet 9 at the right hand margin thereof. As hereinbefore described, the two styli will under the conditions last mentioned trace exactly parallel lines near opposite margins of the sheet during the interval in which rack bar 58 is being brought into operation and rack bar 57 is being thrown out of operation and locked. Both of these parallel lines indicate the water levels during this period. When the water falls below the predetermined height, rack bar 58 will be thrown out of operation and locked, and stylus 78 will resume the operation of making the "datum" line on sheet 9 at the left hand margin thereof. Rack bar 57 will again be brought into operation causing stylus 74 to move across sheet 9 and resume the operation of making a water level record thereof. The operation of the second embodiment of the invention is substantially the same, except that through the connections before described, variations above the predetermined high point are recorded on a reduced scale.

From the foregoing it will be perceived that I have provided a compact and simply constructed recorder employing a record-sheet of narrow width for receiving records of extreme variation; have largely eliminated the liability of the machine getting out of order by reason of strain or wear upon the connections between the timing mechanism and the other parts of the device; have provided connections between the timing mechanism and the other parts of a simple character whereby unskilled workmen can remove the timing mechanism in the shortest possible space of time; and have effectively avoided the objections due to wrinkling and other irregularities in the surface of the record-sheet as heretofore employed. Furthermore, I have provided means whereby a record of abnormal variations may be produced on a different scale from that employed for normal variations. All of these desirable features are effected without unnecessarily increasing the size of the machine.

What is claimed is:—

1. In a recorder for recording a variable force or movement, the combination of a record-sheet, timing mechanism comprising a driving roll for said sheet and a clockwork escapement, a shaft driven by said roll and having a slotted end, a sleeve on said shaft, a yoke passing through said sleeve and engaging said slot, a driving shaft for said escapement, a member on said driving shaft loosely engaged by the arms of said yoke, and a recording means actuated by the variant force or movement.

2. In a recorder for recording a variable force or movement, the combination of a record-sheet and recording means, with a timing device comprising a driving roll for said sheet and a clockwork escapement, a shaft on said roll, a gear on said shaft, a pinion driven by said gear, and a universal joint connection between the shaft of said pinion and said clockwork escapement.

3. In a recorder for recording a variant force or movement, the combination of a plurality of styles, a plurality of sets of means actuated by the variant for independently and successively operating said styles, and devices for throwing one set of operating means out of operation and simultaneously throwing the next succeeding set into operation.

4. In a recorder for recording a variant force or movement, the combination of a plurality of styles, a plurality of rack-bars one for each style, means actuated by the variant for successively operating the rack-bars, and a positively actuated locking device engaging each rack-bar when out of operation.

5. In a recorder for recording a variant force or movement, the combination of a plurality of styles, a plurality of sets of means actuated by the variant for independently and successively operating said styles, and devices locking one set of operating means against movement while the succeeding set is in operation.

6. In a recorder for recording a variant force or movement, the combination of a plurality of styles, separate rack-bars successively actuated by the variant and each carrying one of said styles, and means actuated by each rack bar at the termination of its movement to lock it in its position of rest.

7. In a recorder for recording a variant force or movement, the combination of a plurality of styles, a plurality of racks successively actuated by said variant, means actuated by each rack as it passes out of action for throwing the next succeeding rack into operation, and a locking device simultaneously releasing one rack and locking the last preceding rack.

8. In a recorder for recording a variant force or movement, the combination of a plurality of racks actuated by the variant, a separate style moved by each rack, a pinion for each rack, means actuated by the variant and driving said pinions, a latch plate having an element in locking engagement with one rack and a second element controlled by an adjacent rack, whereby the movement of the last-named rack releases the lock of the next succeeding rack.

9. In a device of the character described, the combination of two successively operable rack-bars, and means actuated by the variant for operating the same, with locking means engaging the stationary rack-bar and means actuated by the terminal movement of the moving rack-bar to release said locking means.

10. In a recorder for recording a variant force or movement, a track or way, two parallel rack bars each supported by a plurality of carriages on said track or way, two pinions one for each rack-bar and actuated by the variant, and means on the carriage of one rack-bar in the path of movement of the carriage of the other rack-bar, whereby the terminal movement of one rack bar shifts the other into engagement with its operating pinion.

11. In a recorder for recording a variant force or movement, the combination of a recording sheet, two recording styles in constant engagement therewith, one for recording one part of said variant force or movement and the other for recording another part thereof, and means for successively bringing said styles into operation.

12. In a recorder for recording a variant force or movement, the combination of a record-sheet, a plurality of styles in constant engagement therewith, means actuated by the variant and successively moving said styles across the sheet, and a timing mechanism moving said sheet past the styles.

13. In a water stage recorder, the combination of a shaft actuated by variations of the water stage, a plurality of pinions on said shaft, a separate rack for each pinion one of which is in operative engagement with its pinion, and means disengaging said rack therefrom and bringing the next succeeding rack into operative relation with its pinion, and a plurality of styles each operatively connected to one of the racks.

14. In a recorder for recording a variant force or movement, the combination of a plurality of recording styles, means actuated by the variant successively operating said styles the one at a different ratio from the next succeeding one.

15. In a recorder for recording a variant force or movement, the combination of a plurality of styles, racks operatively connected thereto, one for each style, separate pinions of different diameters actuated by the variant, one pinion for each rack, and devices for throwing the racks and their respective pinions successively into operative relation.

16. In a recorder for recording a variant force or movement, the combination of two recording styles, two racks operatively connected thereto, a shaft actuated by the variant, two pinions of different diameters on said shaft one of which is engaged by one of the racks, and means simultaneously disengaging the last-mentioned rack and pinion and bringing the other rack and pinion into operative engagement.

17. In a recorder for recording a variant force or movement, the combination of a stock or feed roll having a record-sheet wound thereon, a driving drum, a tension roll and a receiving roll, with a style resting on the sheet while on said stock roll, and means actuated by the variant and moving the style over said sheet.

18. In a recorder for recording a variant force or movement, the combination with recording means of a stock or feed-roll, a driving drum, a record-sheet wound on the feed-roll and extending therefrom to the driving drum without intermediate support, and a gravity roll resting on the sheet between the feed-roll and driving-drum, whereby bulging of the sheet is avoided and its even engagement with the driving drum is insured.

19. In a recorder for recording a variant force or movement, the combination with recording means of a stock or feed-roll, a driving-drum, a record-sheet wound on the feed-roll and extending therefrom to the driving drum and supported solely by said feed-roll and driving-drum, and a gravity roll floating on the sheet between the feed-roll and driving-drum.

20. In a recorder for recording a variant force or movement, the combination of a stock or feed-roll, a driving-drum, a record-sheet wound on the feed-roll and extending therefrom to the driving-drum and supported solely by said roll and drum, and a uniform tension device applied across the surface of the sheet between said roll and drum.

21. In a recorder for recording a variant force or movement, the combination of a plurality of styles, a rack-bar for each style, means actuated by the variant and operatively engaging said rack-bars in succession, and means actuated by each rack-bar on its initial movement and imparting a thrust to the last preceding rack-bar to completely throw it out of operation.

22. In a recorder for recording a variant force or movement, the combination of a plurality of styles, a rack-bar carrying each style, means actuated by the variant and operatively engaging said rack-bars in succession, and means throwing each rack-bar into operation during the terminal movement of the last preceding rack-bar.

23. In combination, a plurality of rack bars, guide members on which said bars are adapted to travel, a driving pinion common to said rack bars for advancing the same, means for coupling one bar with its companion bar when one bar is about to ride off said pinion, a rocking member adapted to be moved by the advance of one rack bar and to simultaneously advance the companion bar to a locked position remote from accidental engagement with said pinion.

24. In combination, a plurality of rack bars, a guide member on which said bars are adapted to travel, a driving pinion common to said rack bars for advancing the same, means on said bars for coupling the same when one of said bars nears the end of its traverse, and means operated by one bar for advancing the companion bar into locked position at the end of its traverse.

In testimony whereof I have signed this specification.

CARL H. AU.